United States Patent [19]

Miura et al.

[11] Patent Number: 5,345,560
[45] Date of Patent: Sep. 6, 1994

[54] PREFETCH BUFFER AND INFORMATION PROCESSING SYSTEM USING THE SAME

[76] Inventors: Shuuichi Miura, 313 Izumigamoriryo, 20-1, Mizukicho 2-chome; Kenichi Kurosawa, 22-2, Mikanoharacho 2-chome; Tetsuaki Nakamikawa, 17-1-402, Moriyamacho 3-chome; Kenji Hirose, 17-11-205, Hidakacho 5-chome, all of Hitachi-shi, Ibaraki-ken, Japan

[21] Appl. No.: 921,742

[22] Filed: Jul. 30, 1992

[30] Foreign Application Priority Data

Jul. 30, 1991 [JP] Japan ................. 3-190240

[51] Int. Cl.$^5$ ............................................. G06F 12/02
[52] U.S. Cl. ..................................................... 395/250
[58] Field of Search .................. 395/250, 375, 425; 364/239, 239.1–239.9, 238.6

[56] References Cited

U.S. PATENT DOCUMENTS 4,714,994 12/1987 Oklobdzija et al. ................. 395/375
4,943,908 7/1990 Emma et al. .......................... 395/375

FOREIGN PATENT DOCUMENTS 0389175 9/1990 European Pat. Off. .

Primary Examiner—Dale M. Shaw
Assistant Examiner—Sang Hui Kim

[57] ABSTRACT

A prefetch buffer adapted to be installed between a cache memory and a main memory in a computer system having a CPU. The prefetch buffer includes a buffer storage having at least one entry for storing prefetched data and an address tag, which is to be used for searching the data, as a pair; a data searcher for searching, from the data stored in the buffer storage, for data having an address requested by the CPU; and an address estimator for determining an address of data to be prefetched next from the main memory, based on the address requested by the CPU and also on a history of the addresses of data prefetched in the past from the main memory; and an address generator for generating an address of data to be prefetched from the main memory. With this arrangement, it is possible to improve the hit ratio of the prefetch buffer regardless of the direction in which the access address varies.

13 Claims, 15 Drawing Sheets

PREFETCH BUFFER AND INFORMATION PROCESSING SYSTEM USING THE SAME

BACKGROUND OF THE INVENTION

1. Field of the Invention

This invention relates to a data prefetch buffer for a computer system, and to an information processing system to which the data prefetch buffer is applied.

2. Description of the Related Art

In computer systems, and workstations in particular, the performance has recently being improved remarkably by the development of high-performance RISC processors. Generally a RISC processor includes a small-capacity cache memory which enables high-speed access, and a low-speed large-capacity main memory. When the amount of data to be processed is small and when no cache errors occur, it is possible to bring out the performance of a RISC processor to it's full extent. However, when the amount of data to be processed is large so that when many cache errors occur, the RISC processor does not execute its program until it has read data from a main memory, so this waiting time reduces the performance. Assuming that the access time of its main memory is the same, every high-speed processor must wait for the same time. Therefore, in the case where many cache errors occur, despite all attempts to improve the performance of the processor, it is impossible to improve the overall processing performance.

It is common knowledge that a prefetch buffer may be used to solve the foregoing problem. This prior art is exemplified by a paper entitled "Improving Direct-Mapped Cache Performance by the Addition of a Small Fully-Associative Cache and Prefetch Buffers" (The 17th Annual International Symposium on Computer Architecture Conference Proceedings, May 1990, pages 364-373) of Norman P. Jouppi. According to this prior concept, when a cache error occurs, data to be fetched from the main memory is read in advance in a small-capacity buffer to eliminate any overhead due to accessing to the main memory.

Other prior art publications concerning the concept of using a prefetch buffer are, for example, Japanese Patent Laid-Open Publications (KOKAI) Nos. SHO 53-134334, SHO 63-75934 and HEI 2-87229, and U.S. Pat. No. 4,714,994.

With this prior prefetch buffer, since instructions of a program are generally executed in the order of address, data to be prefetched are usually limited to data having an address immediately subsequent to data requested from the processor. Prefetching for special cases such as branching and looping processes has also been proposed.

However, if the request address value varies continuously in the backward direction, or if the request addresses are discontinuous, the hit ratio of the prefetch buffer will be deteriorated, and so the performance will be lowered.

SUMMARY OF THE INVENTION

It is therefore an object of this invention to provide a data prefetch buffer which can improve the hit ratio, irrespective of whether request addresses vary in the forward or backward direction.

Another object of the invention is to provide a data prefetch buffer which can improve the hit ratio even when request addresses vary in the forward or backward in direction.

According to a first aspect of the invention, there is provided a data prefetch buffer adapted to be installed between a cache memory and a main memory in a computer system having a CPU, which prefetch buffer comprises: a buffer storage having at least one entry for storing prefetched data and an address tag, which is to be used for searching for the data, as a pair; a data searcher for searching, from the data stored in the buffer, for data having an address requested by the CPU; and an address estimator for determining an address of data to be prefetched next in the main memory, based on the address requested by the CPU and also on a history of the addresses of data prefetched in the past in the main memory; and an address generator for generating an address of data to be prefetched from the main memory according to the determination of said address estimator.

Preferably the address estimator determines the difference between a request address from the CPU and the address immediately previously requested by the CPU and then estimates, based on the value of the difference, an address of data to be prefetched from the main memory.

The buffer storage preferably includes n entries, when n is an integer larger than 1, and the data searcher preferably searches, from all entries, for the data having the request address from the CPU. Of course the data searcher can also search a zone optionally designated or selected.

For example, the address generator may generate, as addresses of data to be prefetched, n addresses contiguous to the address of data requested by the CPU.

The address estimator can also obtain a data address, which is to be prefetched from the main memory, by taking the difference between the request address from the CPU and the address immediately previous requested by the CPU and adding to the request address a value obtained by multiplying the value of the difference by k, where k is an integer between 1 and n.

With the first arrangement of the invention, the address generator generates n successive addresses succeeding the request address from the CPU, reads from the main memory n data, where preferably n is an integer larger than 1, having n addresses, and stores the data in the n-level buffer. The data searcher searches for addresses requested from the CPU, from all entries in the buffer. Assuming that the subsequent addresses requested from the CPU are addresses which are from the immediately previous request address +1 to +n, the prefetch buffer will hit.

When a subsequent address requested from the CPU is lower than the request address, the address estimator alters the address of prefetched data in the reverse direction. The prefetch buffer can thereby hit even when the address varies in the reverse direction.

With another arrangement, the address estimator takes the difference between an immediately previous request address and a request address from the CPU, reads data having an address, which is the request address + the difference X k, where k is an integer between 1 and n, from the main memory and stores the data in the n-level buffer. Therefore, when the subsequent address requested from the CPU is data having an address which is the immediately previous address + the difference X k, where k is an integer between 1 and n, the prefetch buffer can hit.

Thus in this invention, since the address estimator estimates, based on a history of addresses requested from the processor, a subsequent address to be requested, it is possible to increase the hit ratio of the prefetch buffer for either discontinuous request addresses or decreasing addresses, thus improving the performance of a computer system.

DETAILED DESCRIPTION OF THE PREFERRED EMBODIMENT

Various embodiments of this invention will now be described in detail with reference to the accompanying drawings.

Figure 2:
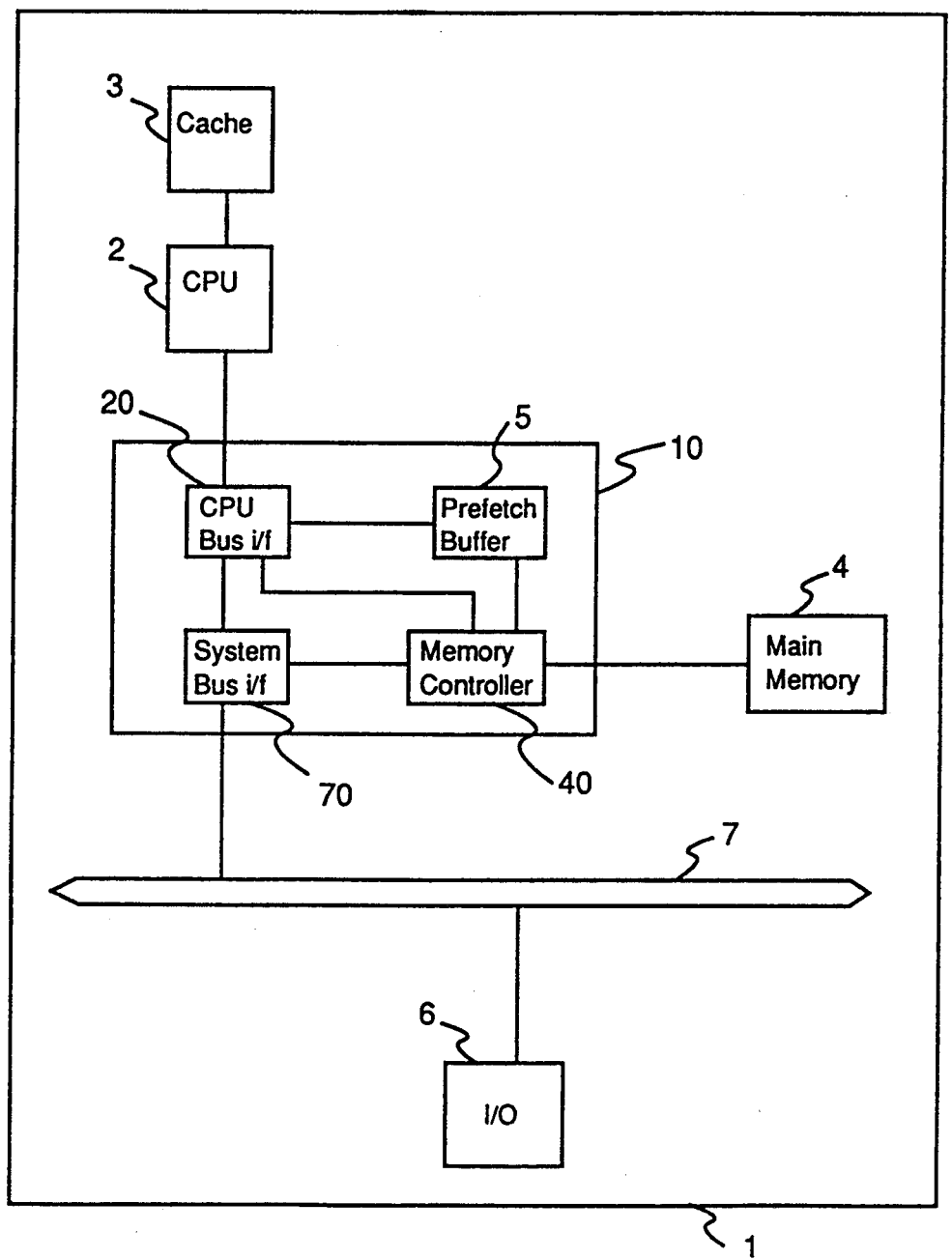
FIG. 2 is a diagram showing a computer system in which the data prefetch buffer of the invention is incorporated.

FIG. 2 is a block diagram of a computer system 1 in which a data prefetch buffer according to a first embodiment of this invention is incorporated. The computer system 1 generally comprises a CPU 2 for performing arithmetic operations or control operations, a cache memory 3 used as a high-speed, small-capacity storage, a main memory 4 used as a low-speed, large-capacity storage, an input/output unit (I/O) 6, a system bus 7, and a memory interface 10 linking the CPU 2, the main memory 4 and the system bus 7. The memory interface 10 includes a CPU bus interface 20 interfacing with the CPU 2, a system bus interface 70 interfacing with the system bus 7, a memory controller 40 for controlling the main memory 4, and a data prefetch buffer 5 for reading data stored in the main memory 4 and storing the data.

The CPU 2 searches for needed data in the cache memory 3 and uses the needed data if it is found. In the absence of the needed data in the cache memory 3, the CPU 2 accesses the main memory 4. At the same time the CPU 2 makes a search in the data prefetch buffer 5, reads the needed data, if any, in the prefetch buffer 5, and stores that needed data in the cache memory 3. If needed data are found in the data prefetch buffers, the CPU 2 cancels the access to the main memory 4.

In the absence of the needed data in the data prefetch buffer 5, the CPU 2 fetches the data from the main memory 4, whereupon it uses that data and stores the same data in the cache memory 3. The CPU 2 further fetches data succeeding or preceding the data from the main memory 4 to store in the prefetch buffer 5.

Figure 1:
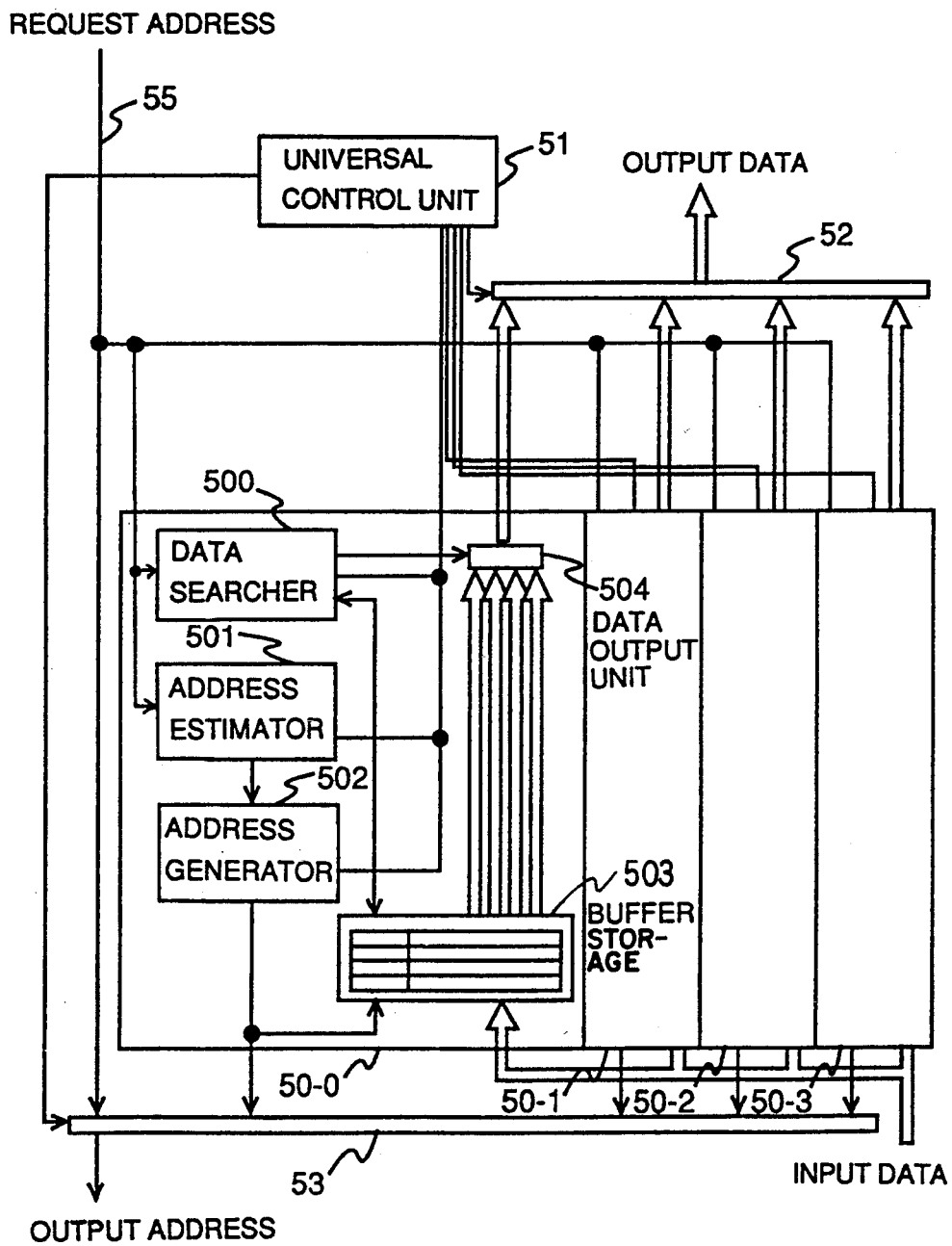
FIG. 1 is a diagram showing a data prefetch buffer according to a first embodiment of this invention.

FIG. 1 shows the data prefetch buffer 5 in detail. In this embodiment, the data prefetch buffer 5 comprises four buffer modules 50-0, 50-1, 50-2, 50-3, a universal control unit 51, a data output multiplexer 52, and an address output multiplexer 53. Each buffer module 50-i (i=0, 1, 2 or 3) includes a data searcher 500, an address estimator 501, an address generator 502, a buffer storage 503 having four entries, and a data output unit 504.

When the CPU 2 makes a data request to the data prefetch buffer 5, a request address will be supplied to the data searcher 500 in the respective buffer module 50-i via an address input line 55. The data searcher 500 will then retrieve any data having an identical address in the buffer storage 503. As a result, if the requested data is there, the data searcher 500 outputs that data to the CPU 2 and the cache memory 3 via the data output unit 504 and the data output multiplexer 52.

Specifically, the address estimator 501 stores the previous request address in order to estimate a subsequent request address. The address generator 502 generates as many addresses of needed data until the data from sufficient addresses (four in this embodiment) succeeding or preceding the request address are stored, and then sends the addresses to the main memory 4 via the address output multiplexer 53 to obtain the needed data, whereupon the address generator 502 stores the obtained data in the buffer storage 503. The address estimator 501 decides whether the data to be stored in the buffer storage 503 is data succeeding the request address or data preceding the request address.

The data searcher 500 searches from the buffer storage 503 and, in the absence of requested data, reports to the universal control unit 51 that it is a mishit.

The universal control unit 51 collects information concerning hit statuses of the four buffer modules 50-0, 50-1, 50-2, 50-3 and, if at least one buffer module 50-i hits, the universal control unit 51 selects this buffer module 50-i and sends the output thereof to the CPU 2 and the cache memory 3 via the data output multiplexer 52. At that time the contents of the buffer storage 503 not selected by the universal control unit 51 are kept unchanged.

When every buffer module 50-i mishits, the universal control unit 51 selects one of the buffer modules 50-i and updates its content according to the following procedures:

(1) For each of the four buffer modules 50-i, the universal control unit 51 determines the difference between the last hit address stored in the address estimator and the current request address.

(2) If there is at least one buffer module 50-i in which the address difference is within the zone of a predetermined threshold, the universal control unit 51 selects that one of the buffer modules 50-i and reads data from the main memory 4 until data having four addresses succeeding or preceding the request address are stored in the buffer storage 503 of the selected buffer module 50-i.

This threshold is used, as a reference value, in determining whether or not the request address is an address adjacent to the last hit address. If the address difference is within the zone of the threshold, the universal control unit determines that the address is adjacent to the last hit address, and fetches data from the buffer storage 503.

In this embodiment, if the request address is larger than the last hit address stored in the address estimator 501 and if the address difference does not exceed 4, the address estimator 501 reads successive data succeeding the request address. If it is smaller than the last hit address and if the address difference does not exceed 4, the address estimator 501 controls the address generator 502 so as to read successive data preceding the request address.

The mode in which succeeding data is to be read and the mode in which preceding data is to be read are switched over only when the prefetch buffer mishits and so the address difference does not exceed 4. Otherwise the mode remains constant for the address estimator 501 in each buffer module 50-i.

(3) If there is no buffer module 50-i in which the address difference is smaller than the threshold, the universal control unit 51 selects from the buffer modules 50-i the buffer module to which no access has been made for the longest time, and reads data from the main memory 4 until data having four addresses succeeding or preceding the request address are stored in the buffer storage 503 of the selected buffer module 50-i.

After the foregoing procedures (1), (2) and (3), the last hit address stored in the address estimator 501 of the buffer module 50-i in which data has been switched over is initialized to the request address.

During the reading of the data from the main memory 4, the prefetch buffer 5 accepts any requests from the CPU 2. Consequently in the buffer storage 503 of each buffer module 50-i, the maximum amount of data items might be fetched. In such an event, the buffer storage 503 identifies valid entries and invalid entries in the buffer storage 503, whereupon the universal control unit 51 controls so as to search for the valid data.

When data has been stored in the main memory 4 from the CPU 2 or the I/O 6, the data searcher 500 in each buffer module 50-i investigates whether or not the buffer storage 503 stores data of the relevant address, and resets the contents of any buffers storage units 503 having such addresses.

Figure 3:
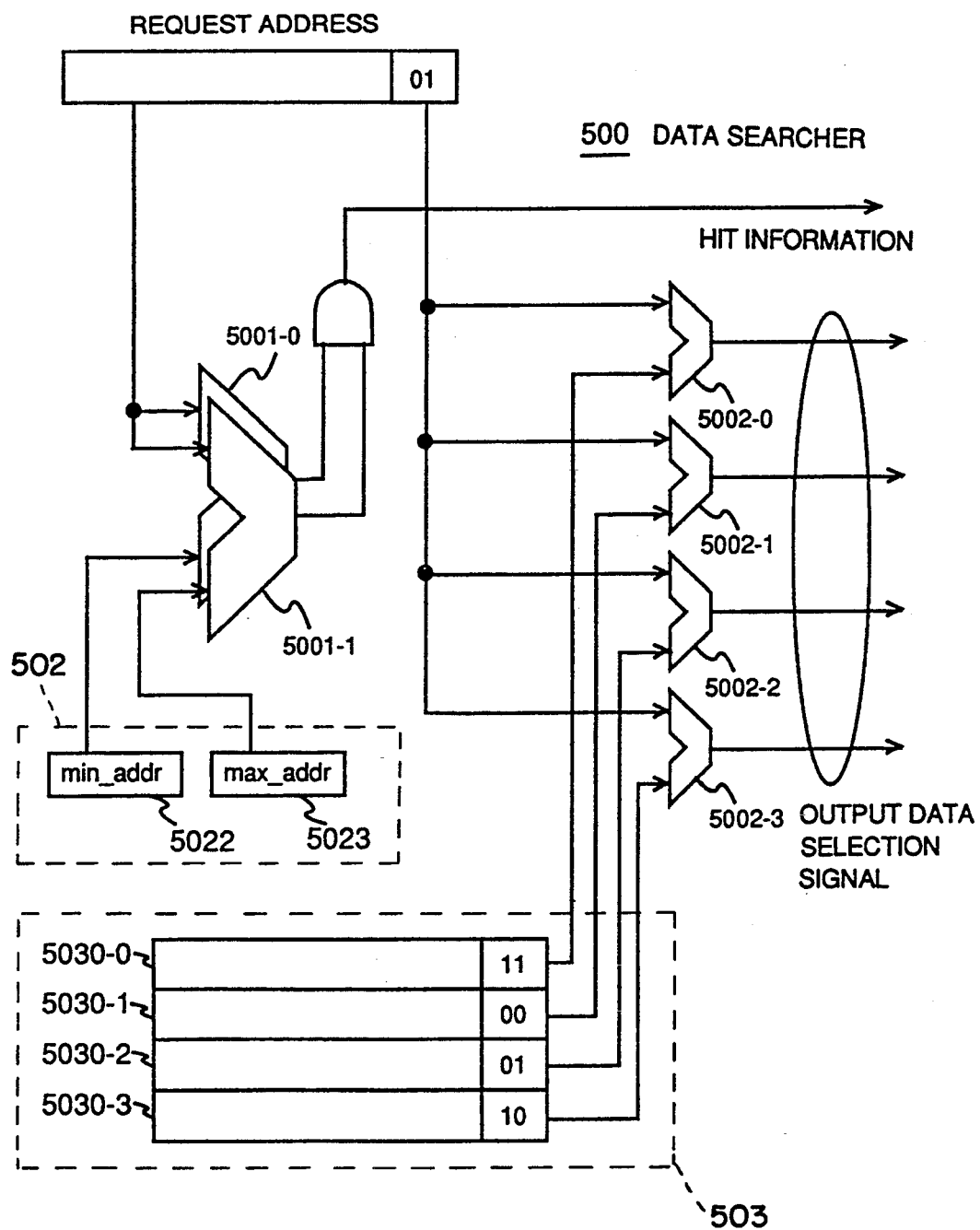
FIG. 3 is a diagram showing a data searcher shown in FIG. 1.

FIG. 3 shows the data searcher 500 in detail. The minimum address and the maximum address of prefetched data stored in the buffer module 50-i are stored in the minimum address register 5022 and the maximum address register 5023, respectively, in the address generator 502. A comparator 5001-0 compares the request address with the content of the minimum address register 5022 and outputs TRUE if the request address has a value larger than the minimum address. A comparator 5001-1 compares the request address with the content of the maximum address register 5023 and outputs TRUE if the request address has a value smaller than the maximum address. When both the outputs of the comparators 5001-0 and 5001-1 are true, it is determined that the prefetch buffer has hit.

Each of comparators 5002-0, 5002-1, 5002-2, 5002-3 compares the least significant 2 bits of the request address with the least significant 2 bits of the address tag stored in a respective one of four address entries 5030-0, 5030-1, 5030-2, 5030-3 in the buffer storage 503, and outputs TRUE when they are identical with one another. Based on this output signal, it is finally determined which one of the four entries in the buffer storage 503 has been hit.

Figure 4:
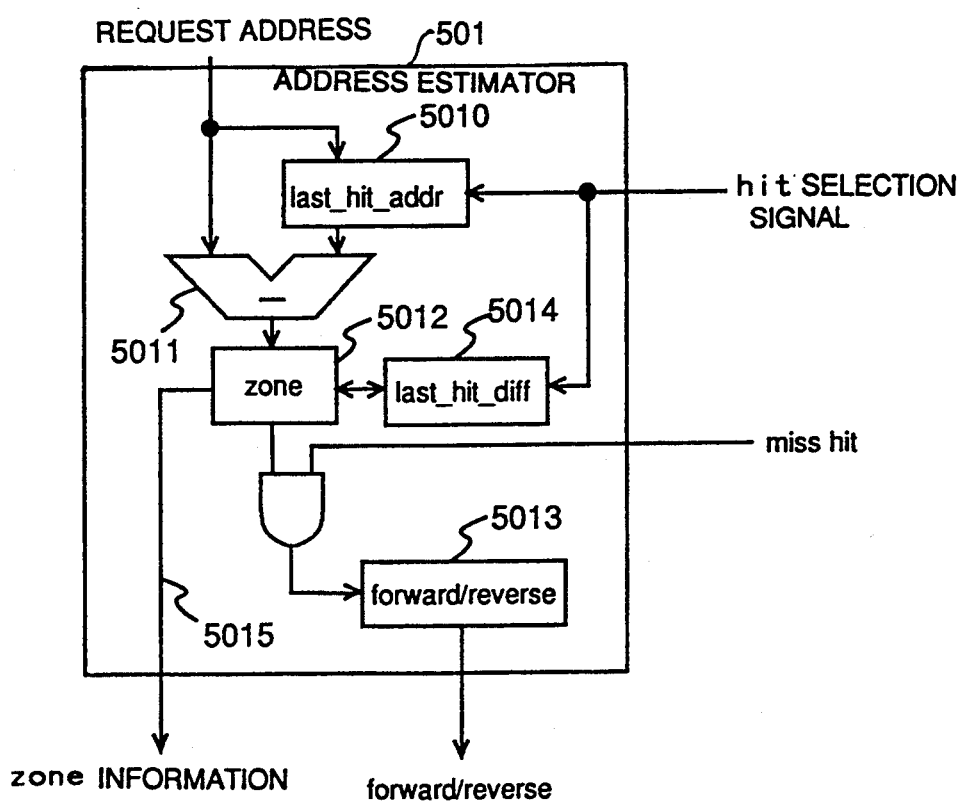
FIG. 4 is a diagram showing an address estimator shown in FIG. 1.

FIG. 4 shows the address estimator 501 in detail. A subtracter 5011 obtains the difference between the request address and the last hit address stored in a last hit address register (last hit addr) 5010. A zone discriminating circuit (zone) 5012 determines this address difference, and activates zone information if the difference is within the zone of a predetermined threshold. If every buffer module 50-i mishits, the zone information 5015 is used, in the universal control unit 51, in determining the buffer module 50-i into which new prefetch data is to be fetched. The threshold, which is "8" in this embodiment, is a reference value with respect to which it is to be determined whether the request address is adjacent to the last hit address or not.

The zone discriminating circuit 5012 reloads the value of an address forward/reverse register 5013 when the absolute value of the address difference does not exceed 4 and when the sign of the difference is different from the sign of a last hit address difference register (last hit dill) 5014 and when every buffer module 50-i mishits. Based on the value of the address forward/reverse register 5013, it is determined whether the buffer module 50-i will previously read addresses in the forward direction or in the reverse direction.

If the request address is hit in the buffer module 50-i, the request address as the last hit address is previously stored in the last hit address register 5010. The content of the last hit address difference register 5014 is also updated by the last hit address difference now calculated. Further when every buffer module 50-i mishits and when data succeeding the request address is to be loaded in the buffer storage 503 of the buffer module 50-i, the request address is stored, as an initial value, in the last hit address register 5010, and a previous designated initial value is stored in the last hit address difference register 5014.

Figure 5:
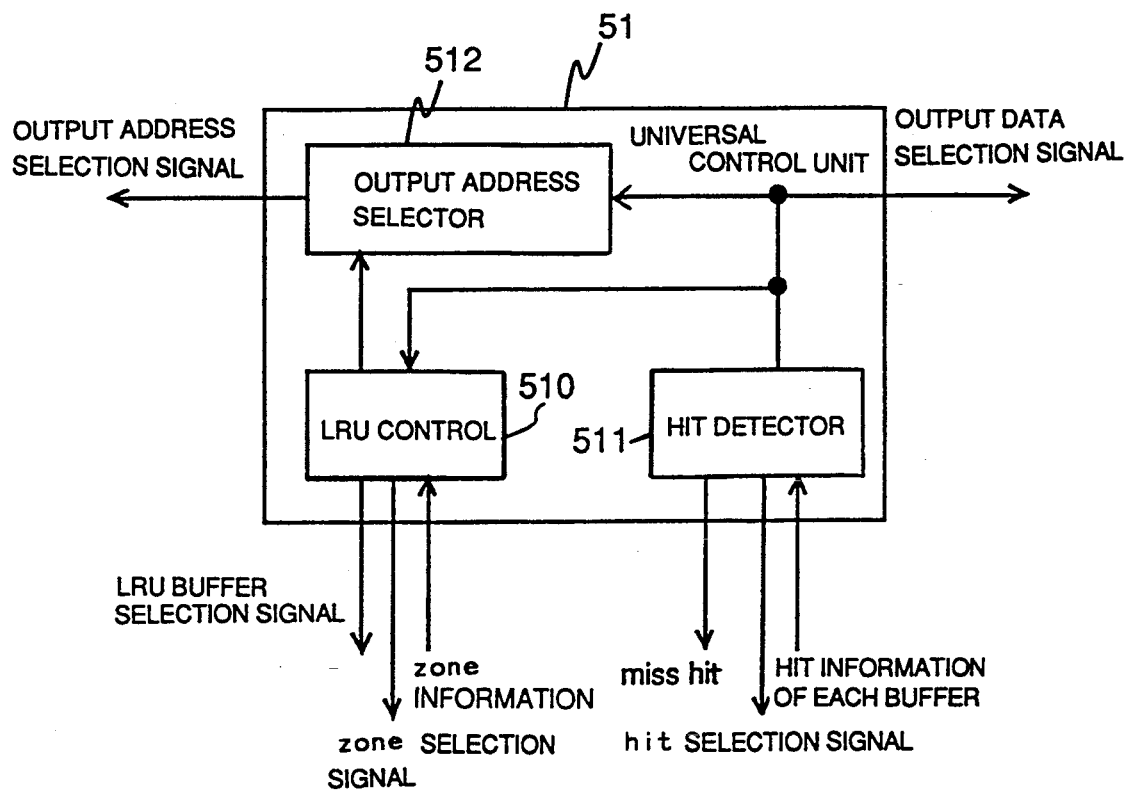
FIG. 5 is a diagram showing a universal control unit shown in FIG. 1.

FIG. 5 shows the universal control unit 51 in detail. Hit information for every buffer module 50-i is collected in a hit detector 511. When there is at least one buffer module 50-i which has a hit, the hit detector 511 selects one hit buffer module 50-1 according to a predetermined rule and activates a hit selection signal to the selected buffer module 50-i. Further, hit information is applied to an LRU control unit 510, an output address selector 512, and the data output multiplexer 52 in the form of the hit selection signal from hit detector 511. If there is no hit buffer module 50-i, miss hit information is notified to every buffer module 50-i by activating a signal line (miss hit).

The LRU control 510 obtains, from a history of the hit buffer modules 50-i the buffer module 50-i, identification of which has not been accessed for the longest time. When there is no buffer module 50-i in which the zone information 5015 generated by the address estimator 501 is activated, the LRU buffer selection signal to be obtained is issued to the buffer module 50-i having not been accessed for the longest time. At that time, the data succeeding or preceding the request address is read from the main memory 4 and is stored in the buffer module 50-i designated by the LRU buffer selection signal. If the zone information 5015 is active for at least one buffer module 50-i, the LRU control 510 selects one of the buffer modules 50-i and activates the zone selection signal to the selected buffer module 50-i.

The output address selector 512 notifies the address output multiplexer 53 that the output address from the buffer module 50-i designated by the hit detector 511 or the LRU control 510 is outputted to the main memory 4. If there is no designation by the hit detector 511 or the LRU control 510, it is notified that the request address is outputted to the main memory 4.

Figure 6:
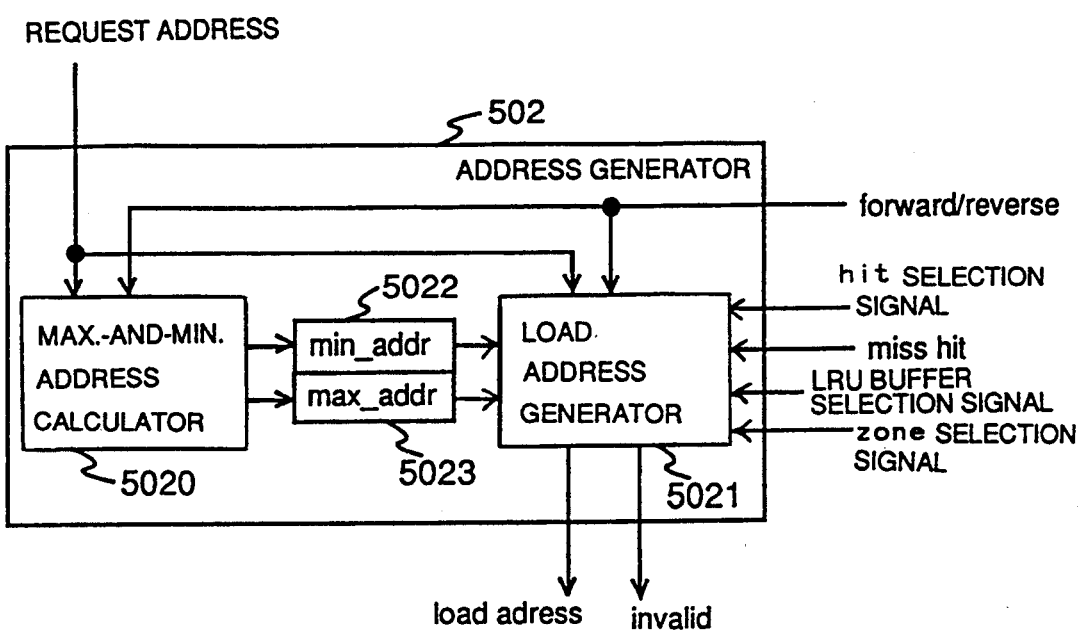
FIG. 6 is a diagram showing an address generator shown in FIG. 1.

FIG. 6 shows the address generator 502 in detail. A maximum-and-minimum-address calculator 5020 obtains, from the request address and the address forward or reverse direction, the maximum address and the minimum address of data to be subsequently stored in the buffer, and stores the subsequent minimum and maximum addresses in a minimum address register 5022 and a maximum address register 5023, respectively. A load address generator 5021 obtains, from the request address, the address forward or reverse direction, the hit selection signal, the LRU buffer selection signal and the zone selection signal, an address of data to be loaded from the main memory 4 and outputs the last-named address. The load address generator 5021 also generates an invalid signal designating data not needed in the buffer storage 503 and outputs the invalid signal to the buffer storage 503.

At the time of a hit, the load address generator 5021 selects, in data having four addresses succeeding or preceding the request address, data not stored in the buffer storage 503 and then generates addresses of that data successively. When the LRU buffer selection signal is active, or when both the zone selection signal and the signal line (miss hit) are active, the load address generator 5021 generates four address succeeding or preceding the request address.

Figure 7:
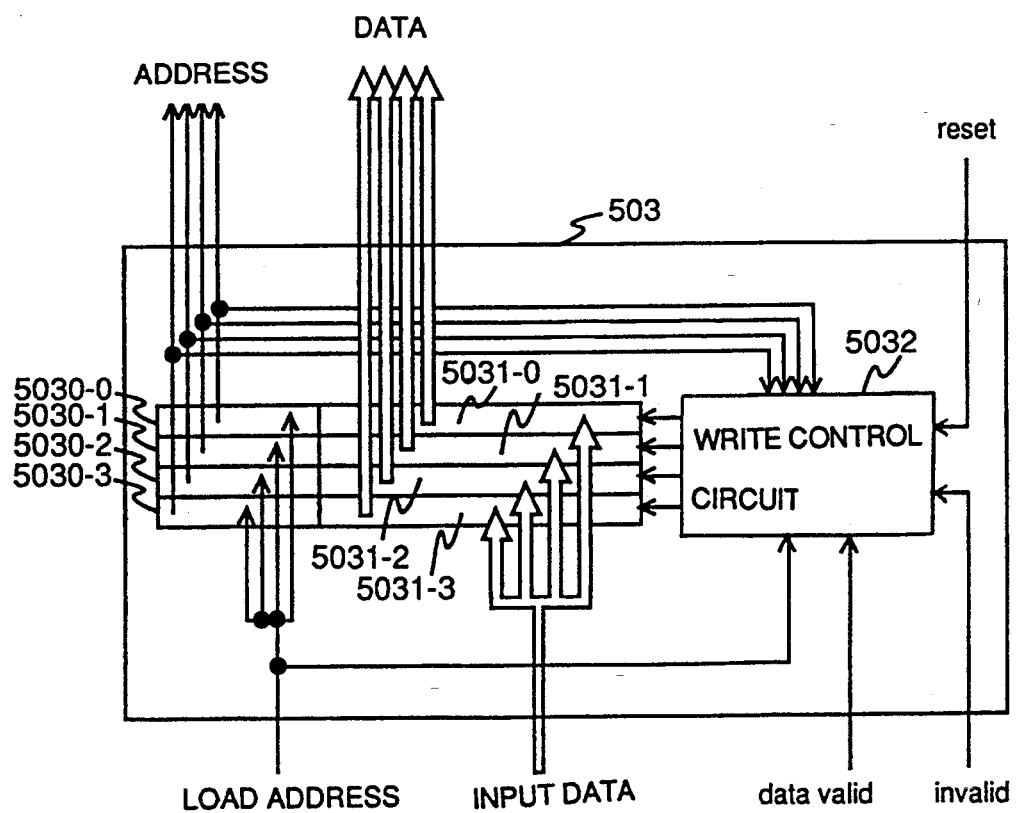
FIG. 7 is a diagram showing a buffer storage shown in FIG. 1.

FIG. 7 shows the buffer storage 503 in detail. Four address entries 5030-0, 5030-1, 5030-2, 5030-3 store address tags, and four data entries 5031-0, 5031-1, 5031-2, 5031-3 store data corresponding to the address tags. A write control circuit 5032 controls writing into the address entries 5030-i and the data entries 5031-i and determines the validity/invalidity of each entry.

During address and data storing, the write control circuit 5032 first stores in the invalid address entry 5030-i the load address supplied from the address generator 502. The write control circuit 5032 then stores, according to the input data and the data valid signal sent from the main memory 4, the data, which has been read from the main memory 4, into the data entry 5031-i corresponding to the previously loaded address entry 5030-i.

According to the invalid signal generated by the load address generator 5021, the write control circuit 5032 invalidates the contents of the designated address entry 5030-i and data entry 5031-i. Further when it is detected that the write address to the main memory 4 is stored in the address entry 5030-i, the data searcher 500 generates a reset signal to the buffer storage 503, and then the write control circuit 5032 invalidates the contents for every address entry 5030-i and data entry 5031-i.

In this embodiment, since the address estimator 501 monitors the increase/decrease of the request address, it is possible to hit either in the address forward or reverse direction when the successive request addresses come from the CPU 2. Since the buffer 503 has 4-level entries in which data of four successive addresses are to be stored, it is possible to hit also for every other successive request address, every third successive request address or every fourth successive request address.

Since the buffer storage 503 stores data of four successive addresses, a hit is detected by determining that the request addresses are within the zone between the maximum address and the minimum address in the buffer so that hit data can be selected by the least 2-bit address comparison, thus reducing the hardware of the comparators.

Since the prefetch buffer 5 is operable even if only partial data is stored in four entries of the buffer storage 503, it is not necessary for the CPU 2 to wait until data are stored in all entries of the buffer storage 503, thereby preventing the prefetch buffer 5 from lowering the performance due to access to the main memory 4.

Finally since there are four buffer modules 50-i, at most four predetermined rules for hitting the request address may be stored so that the prefetch buffer 5 can hit at higher possibility. That is, since the rules for hitting the request address can be stored according to the number of buffer modules, it is possible to improve the hit ratio.

Figure 8:
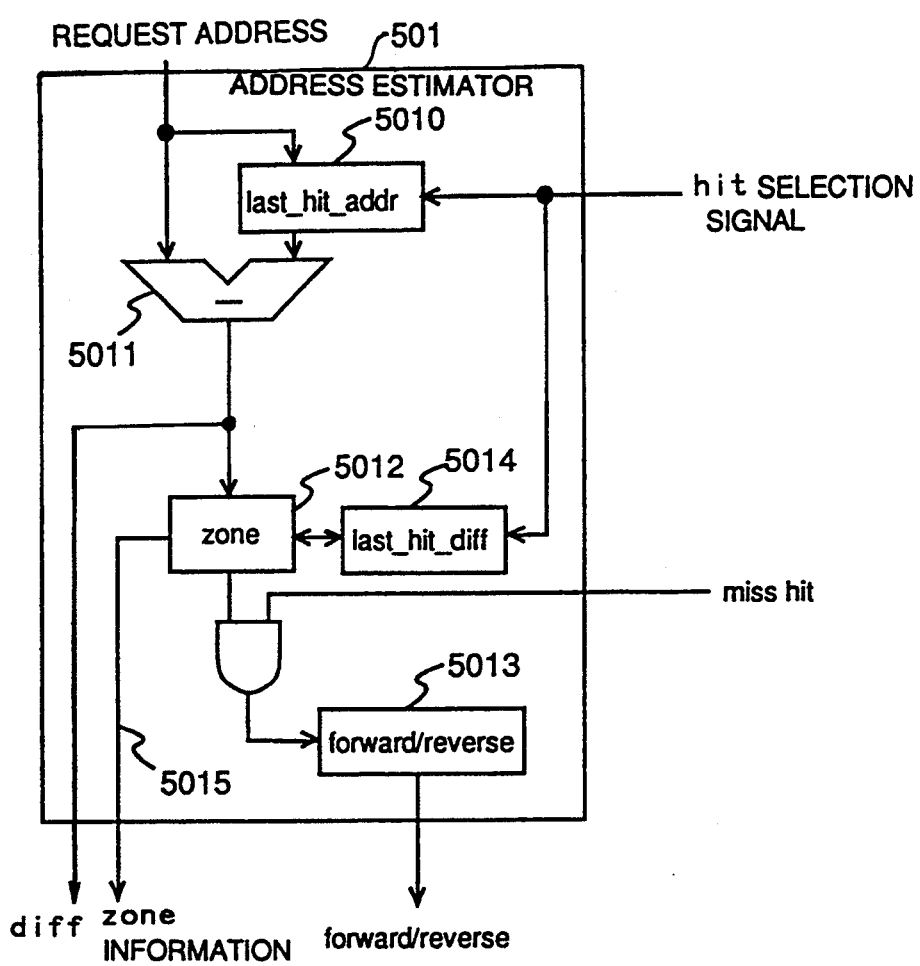
FIG. 8 is a diagram showing a modified address estimator according to a second embodiment of the invention.
Figure 9:
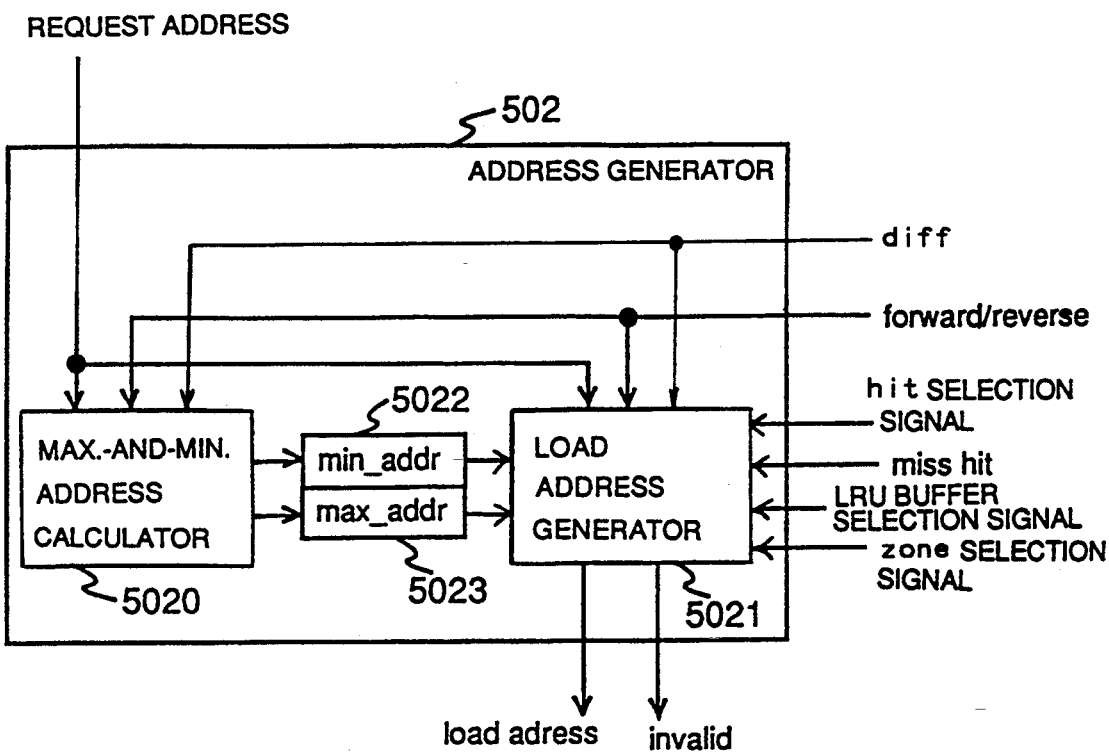
FIG. 9 is a diagram showing a modified address generator according to the second embodiment.
Figure 10:
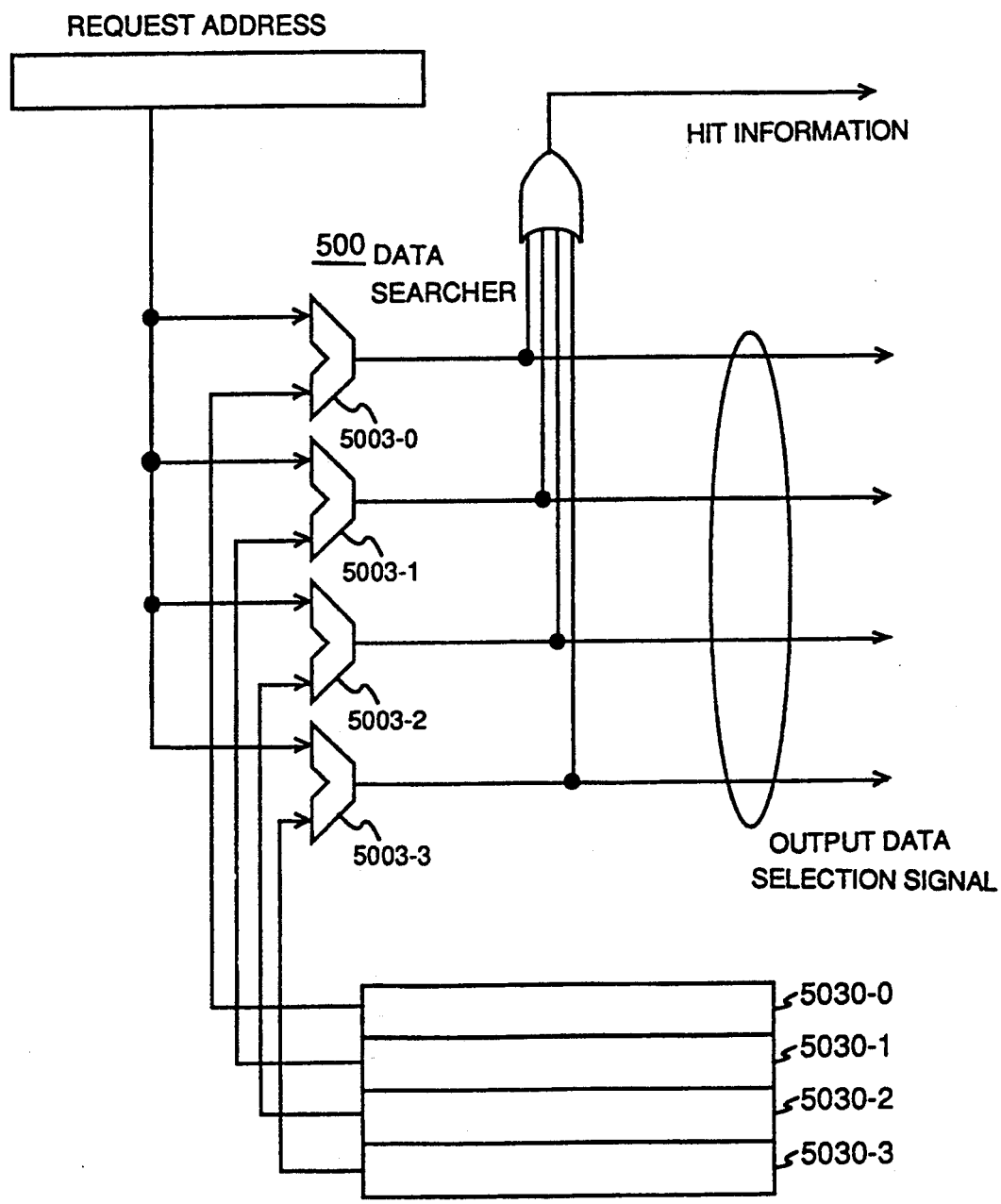
FIG. 10 is a diagram showing a modified data searcher according to the second embodiment.

FIGS. 8-10 show a second embodiment of this invention. This embodiment is different from the first embodiment in the construction of each of the address estimator 501, the address generator 502 and the data searcher 500.

In the address estimator 501 (FIG. 8), the subtracter 5011 determines a difference between the request address and the last hit address stored in the last hit address register 5010. The zone discriminating circuit 5012 determines the address difference and, if the absolute value of the difference is within the zone of a predetermined threshold, activates zone information 5015. Further the difference is supplied to the address generator 502. The threshold is a reference value, by means of which it is determined whether the request address is adjacent to the last hit address or not, and is the value of the last hit address difference register 5014×8.

When the absolute value of the address difference is less than four times the value of the last hit address difference register 5014 and is different in sign from the last hit address difference register 5014, and when every buffer module 50-i mishits, the zone discriminating circuit 5012 reloads the value of the address forward-/reverse register 5013. Based on the value of the address forward/reverse register 5013, determination is made of whether the buffer module 50-i previously read in the address forward or reverse direction.

When a request address hits in the buffer module 50-i, the request address is stored in the last hit address register 5010 as a last hit address. Likewise the content of the last hit address difference register 5014 is updated to the last hit address difference now calculated. If every buffer module 50-i mishits, and if the buffer 503 of the buffer storage module 50-i loads data succeeding the request address, the request address is stored in the last hit address register 5010 as an initial value, and a previously designated initial value is stored in the last hit address difference register 5014.

FIG. 9 shows the address generator 502 of this embodiment in detail. The maximum-minimum address calculator 5020 obtains, from the request address, the address forward or reverse direction and the difference supplied from the address estimator 501, minimum and maximum addresses of data to be subsequently stored in the buffer and stores the obtained minimum and maximum addresses in the minimum address register 5022 and the maximum address register 5023, respectively. The load address generator 5021 obtains, from the request address, the address forward or reverse direction, the hit information, the LRU buffer selection signal, the zone information and the address difference, an address of data to be loaded from the main memory 4 and outputs the obtained address. The load address generator 5021 also generates an invalid signal designating data not needed in the buffer storage 503 and outputs the invalid signal to the buffer storage 503.

At the time of a hit, the load address generator 5021 selects, from data having four addresses succeeding or preceding the request address with intervals of the address difference, data not existing in the buffer storage 503 and generates addresses of that data successively. At that time if data in the buffer storage 503 has an address within the zone between the maximum address and the minimum address and has an address different from the addresses successively generated, the load address generator 5021 generates an invalid signal to invalidate such data.

Further, when the LRU buffer selection signal is active, or when both the zone information and the mishit information are active, the load address generator 5021 generates four addresses succeeding or preceding the request address with intervals of the address difference.

FIG. 10 shows the data searcher 500 of the embodiment. In this data searcher 500, comparators 5003-0, 5003-1, 5003-2, 5003-3 compare the request address with all address tags of prefetched data now stored in the buffer module 50-i, and if there is an identical address tag, the data searcher 500 determines that there is a hit.

According to this embodiment, since the address estimator 501 monitors the request address difference, it is possible to make a full hit either forwardly or reversely in the case of regularly intermittent request addresses. Since the buffer storage 503 has four entries in which data of four regularly intermittent addresses are to be stored, it is possible to hit also when the request address is shifted at the interval of $2 \times$ the difference, $3 \times$ the difference, or $4 \times$ the difference. Further, since there are four buffer modules 50-i, it is possible to store at most four predetermined rules for hitting request addresses. Since it is operable even if data are stored in only part of the four entries of the buffer storage 503, the CPU 2 should not wait until data are stored in all of the entries of the buffer storage 503, thereby preventing the performance of the prefetch buffer 5 from being lowered due to need to access to the main memory 4.

Figure 11:
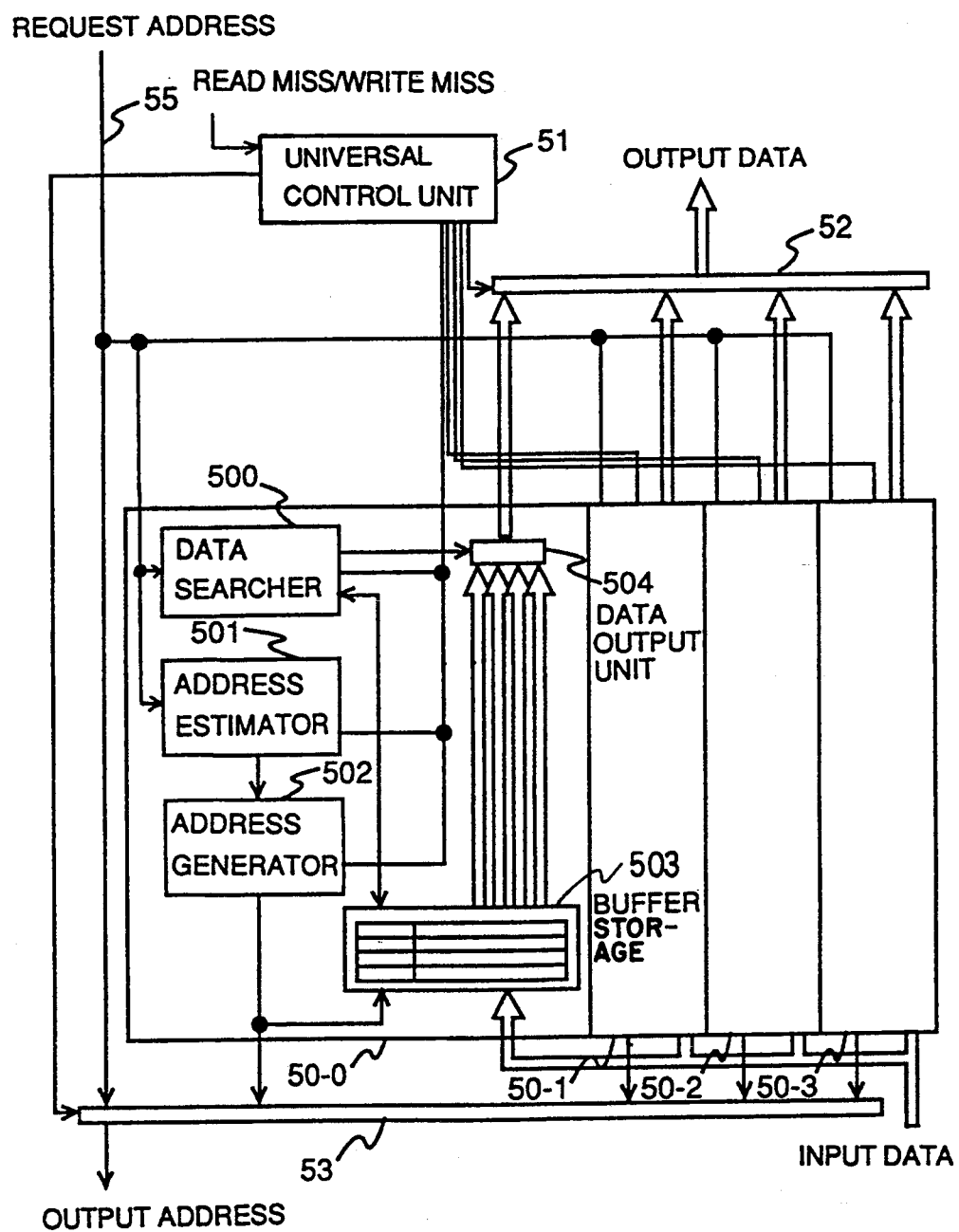
FIG. 11 is a diagram showing a modified data prefetch buffer according to a third embodiment of the invention.
Figure 12:
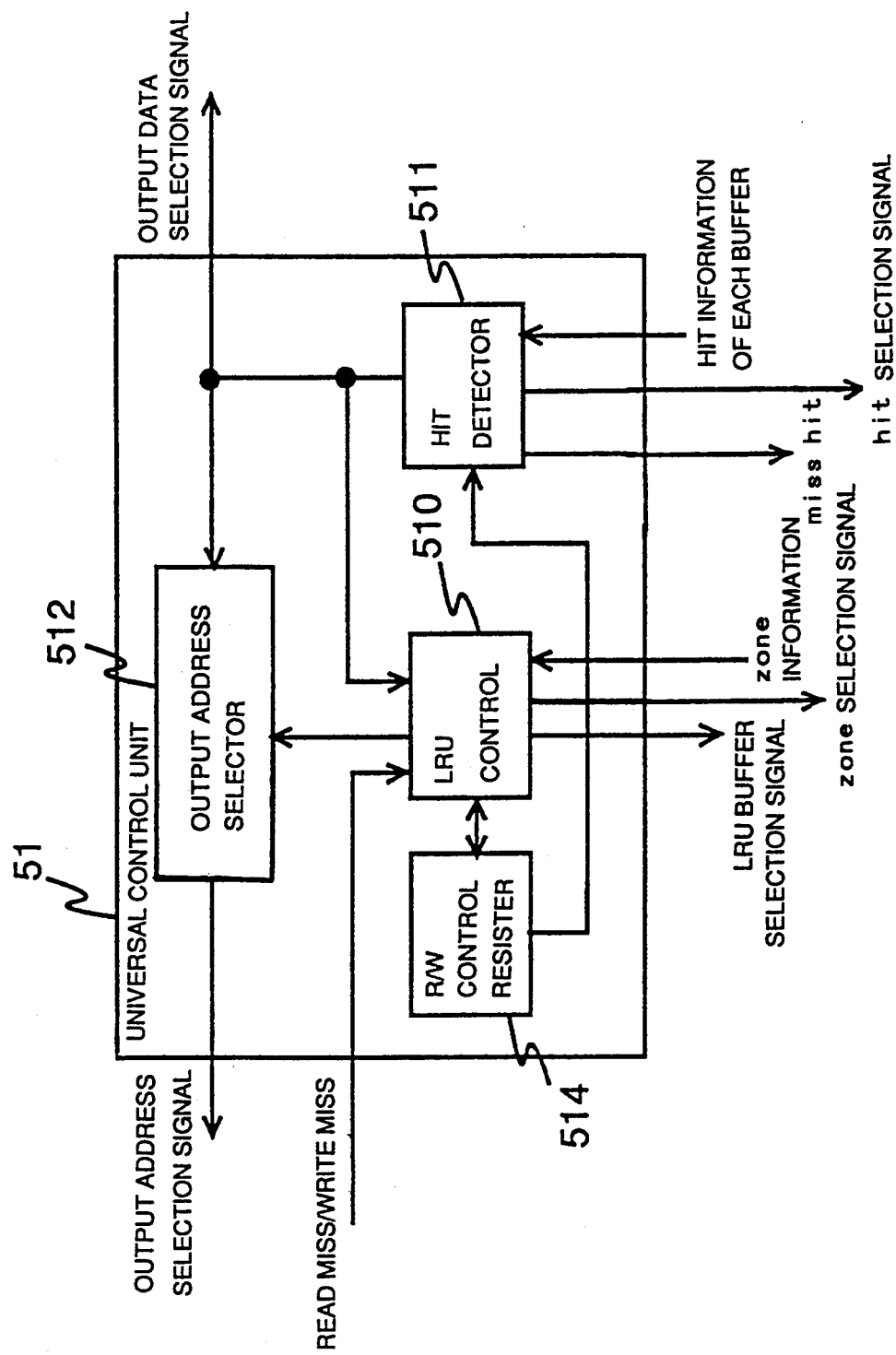
FIG. 12 is a diagram showing a modified universal control unit according to the third embodiment.

FIG. 11 and 12 show a third embodiment of this invention. This embodiment is different from the first embodiment in the universal control unit 51. The universal control unit 51 has a signal line for notifying whether the access to the prefetch buffer 5 by the CPU 2 has been made by read miss or by write miss of the cache memory 3.

FIG. 12 shows the universal control unit 51 of this embodiment in detail. A read/write control register 514 indicates whether each buffer module 50-i stores current data for read miss or current data for write miss. The read/write control register 514 is reloaded by the LRU control 510 and is accessed by the LRU control 510 and the hit detector 511.

Hit information of the individual buffer modules 50-i is collected in the hit detector 511. If there is at least one hit buffer module 50-i in the buffer modules 50-i having an attribute identical to a read-miss/write-miss attribute supplied by the CPU 2, the hit detector 511 selects one of the hit buffer modules 50-i according to a predetermined rule and sends hit information to the LRU control 510, the output address selector 512, the buffer module 50-i and the data output multiplexer 52. If there is no hit buffer module 50-i, the hit detector 511 sends hit miss information to every buffer module 50-i.

The LRU control 510 simultaneously manages the read-miss buffer module 50-i which has not been accessed for the longest time and the write-miss buffer module 50-i which has not been accessed for the longest time. If all of the buffer modules 50-i having the same attribute as that of the request address are mishit, and if there is no buffer module 50-i in which a zone signal is active, the LRU control 510 selects, from the buffer modules 50-i having an attribute different from the attribute of the request address, the buffer module 50-i which has not been accessed for the longest time, and alters that the buffer module 50-i so as to have the same attribute as that of the request address. This attribute is altered and loaded into the read/write control register 514, whereupon the LRU control 510 activates an LRU signal with respect to the buffer module 50-i. As a result, data having addresses succeeding or preceding the request address is stored in the buffer module 50-i.

If there is no buffer module 50-i having an attribute different from that of the request address, the buffer module 50-i not accessed for the longest time is selected from the buffer modules 50-i having the same attribute.

According to this embodiment, it is possible to switch over the buffer module 50-i dynamically so as to be for read miss and write miss. If read miss and write miss were not separated from one another, even when read-miss and write-miss addresses respectively change regularly, they would interfere with one another to confuse address estimation. With this embodiment, however, it is possible to improve the hit ratio of the prefetch buffer 5 in an application where regularity is found in the read-miss addresses and the write-miss addresses, thereby improving the performance of the computer system, compared to the case where read miss and write miss are not separated from one another.

Figure 13:
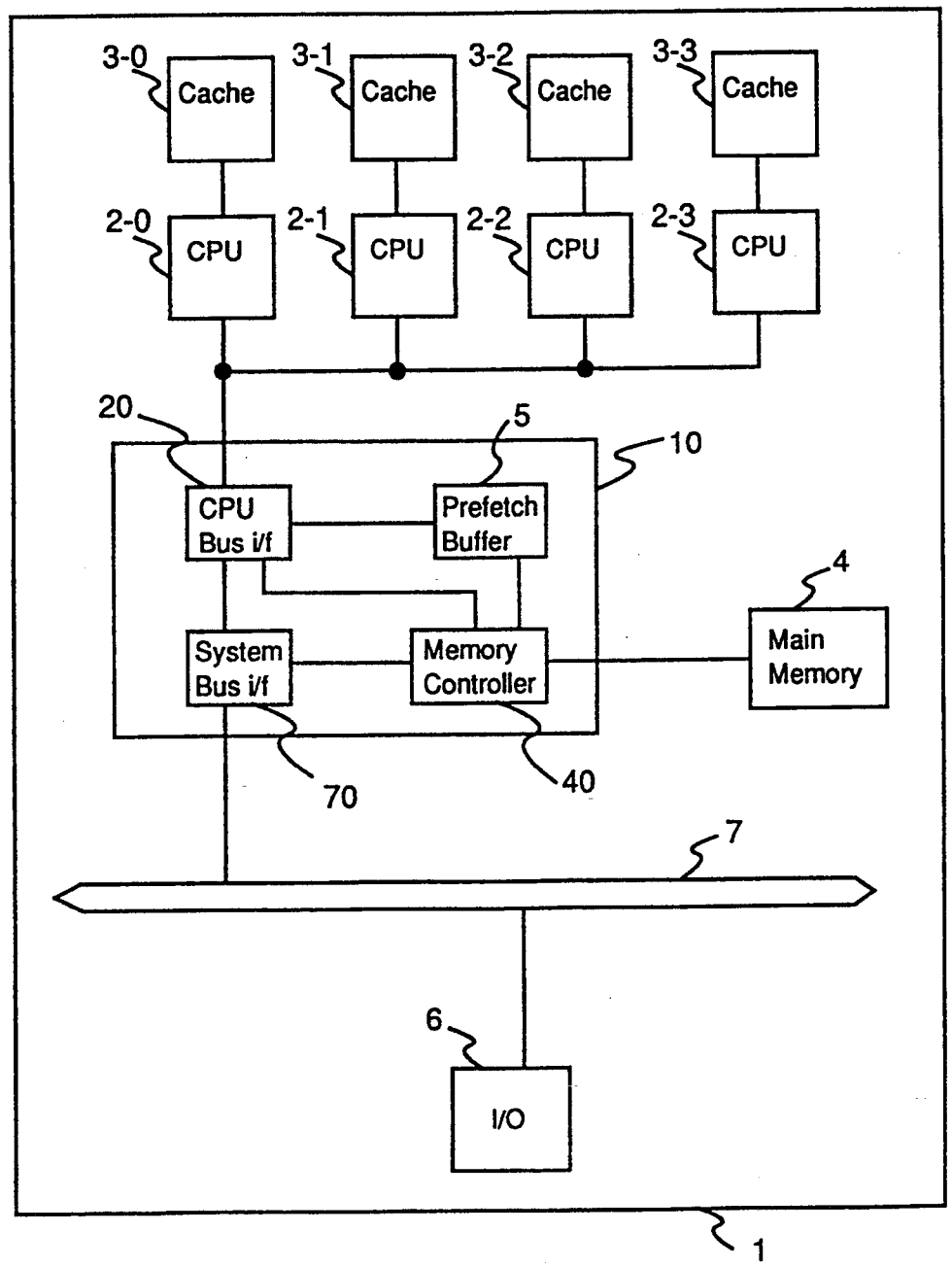
FIG. 13 is a diagram showing a modified computer system according to a fourth embodiment of the invention.

FIG. 13 shows a fourth embodiment of this invention. This embodiment is different from the first embodiment in that the computer system 1 is a multiprocessor structure composed of four CPUs 2. In this embodiment, there are sixteen buffer modules 50-i, four times as many as the case of a single CPU 2.

According to this embodiment it is also possible to improve the performance of a prefetch buffer in a multiprocessor system.

Figure 14:
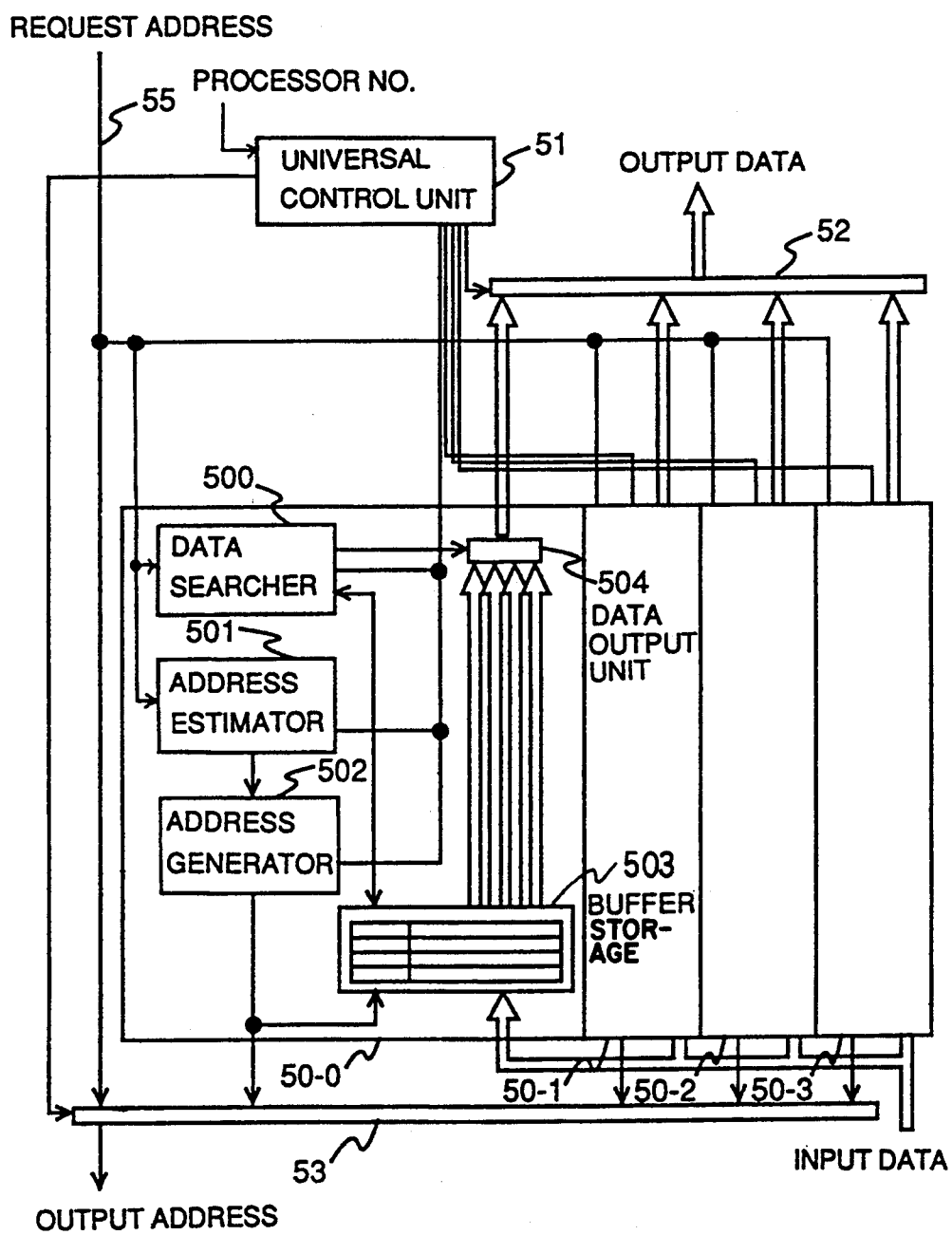
FIG. 14 is a diagram showing another modified data prefetch buffer according to a fifth embodiment of the invention.

FIG. 14 shows a fifth embodiment of this invention. This embodiment is different from the fourth embodiment in that the universal control unit 51 has a signal line for notifying the processor number whose CPU 2 uses access to the prefetch buffer 5.

Figure 15:
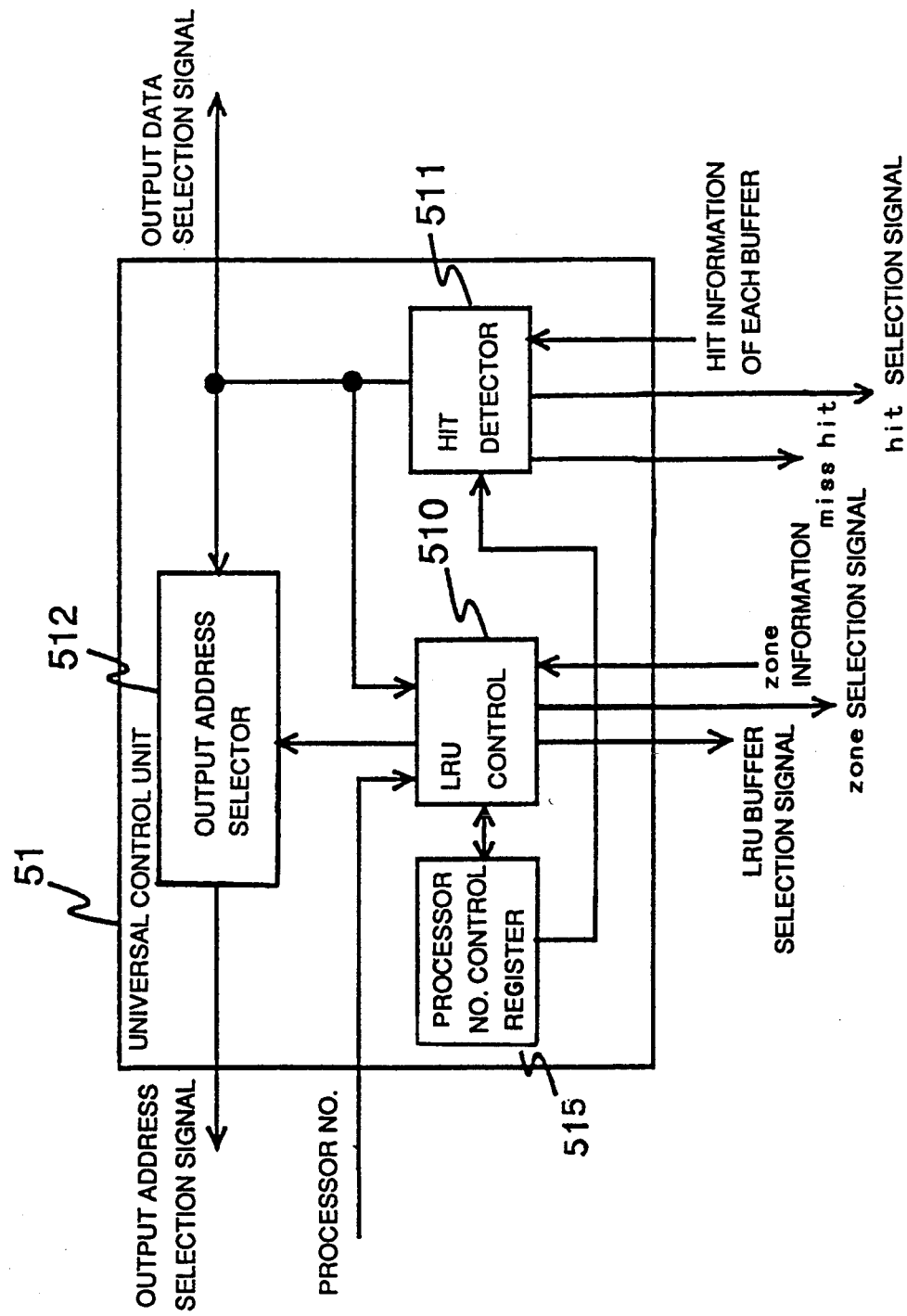
FIG. 15 is a diagram showing another modified universal control unit according to the fifth embodiment.

FIG. 15 shows the universal control unit 51 of this embodiment in detail. A processor number control register 515 indicates the number of the processor whose prefetch data is now stored in each buffer module 50-i. The processor number control register 515 is reloaded by the LRU control 510 and is accessed by the LRU control 510 and the hit detector 511.

Hit information of the individual buffer modules 50-i is collected in the hit detector 511. If there is at least one hit buffer module 50-i of the buffer modules 50-i having the processor number identical with that supplied from the CPU 2, the hit detector 511 selects one of the hit buffer modules 50-i according to a predetermined rule and sends hit information to the LRU control 510, the output address selector 512, the buffer module 50-i and the data output multiplexer 52. Further, if there is no hit buffer module 50-i, the hit detector 511 sends hit-miss information to every buffer module 50-i.

The LRU control 510 controls the buffer module 50-i, which has not been accessed for the longest time, for every processor number. If all of the buffer modules 50-i having the same processor number as that of the request address are mishit, and if there is no buffer module 50-i in which a zone signal is active, the LRU control 510 selects, from the buffer modules 50-i having processor numbers different from that of the request address, and alters the processor number of the selected buffer module 50-i to the processor number of the request address by writing into the processor number control register 515. Then the LRU control 510 activates the LRU signal for that buffer module 50-i. As a result, data having an address succeeding or preceding the request address is stored in that buffer module 50-i.

In the above-mentioned case, when there is no buffer module 50-i having a processor number different from that of the request address, the LRU control 510 selects, from the buffer modules 50-i having the same processor number, the buffer module 50-i which has not been accessed for the longest time.

According to this embodiment it is possible to switch over the buffer modules 50-i according to the processor number. Consequently, addresses are shifted regularly for every processor, and, if the processor numbers are not distinguished from one another, they interfere with one another to confuse address estimation. However, assuming that they are separated from one another, it is possible to improve the hit ratio of the prefetch buffer 5 if regularity can be easily estimated and also to improve the performance of a computer system compared to the case in which the processor numbers are not distinguished from one another.

With the arrangement of this invention, since it is possible to improve the hit ratio of the prefetch buffer as compared to the prior art prefetch buffer, it is possible to sharply relieve the lowering of performance due to access to the main memory from the CPU, thus improving the performance of a computer system. That is, since the data access speed is increased, it is possible to improve the processing rate of the computer system.

What is claimed is:

1. A data prefetch buffer adapted for use between a cache memory and a main memory in a computer system having a CPU, said data prefetch buffer comprising:
    a data buffer storage unit having at least one entry for storing prefetched data and an address tag, the address tag to be used for searching data stored in said data buffer storage unit;
    means for receiving a request address from the CPU;
    a data searcher for searching, from the data stored in said data buffer storage unit, for data having an address the same as the request address;
    an address estimator for estimating an address of data to be prefetched from the main memory, based on the request address and on the history of addresses of data prefetched in the past from the main memory, said address estimator including means for subtracting the request address and an address immediately previously requested by the CPU, and means for using the result of the subtracting to estimate the address of the data to be prefetched from the main memory; and
    an address generator for generating an address of data to be prefetched from the main memory according to the address estimated by said address estimator.

2. A data prefetch buffer according to claim 1, wherein said data buffer storage unit includes a plurality of entries, and said data searcher includes means for searching all of said plurality of entries for data having an address the same as the request address from the CPU.

3. A data prefetch buffer according to claim 2, wherein said address generator includes means for generating, as addresses of data to be prefetched, a like plurality of addresses contiguous to the request address from the CPU.

4. A data prefetch buffer according to claim 3, wherein said address estimator includes an address flag register for storing a flag indicative of a forward direction of address generation or a reverse direction of address generation by said address generator, a latest-hit-address register for storing the address of the most recent hit by said data prefetch buffer, and means for controlling said address generator in such a manner that when said prefetch buffer mishits:
    (a) if the request address is larger than the most recent hit address, and if the absolute value of the result of the subtracting is less than a predetermined value, then a like plurality of successive data succeeding the request address are stored in said data buffer storage unit, said flag is set to indicate the forward direction of address generation, and the request address is stored in said latest-hit-address register, or
    (b) if the request address is smaller than the most recent hit address and if the absolute value of the result of the subtracting is less than the predetermined value, then a like plurality of successive data succeeding the request address are stored in said data buffer storage unit, said flag is set to indicate the forward direction of address generation, and the request address is stored in said latest-hit-address register,
    where the predetermined value is an integer between 1 and the like plurality.

5. A data prefetch buffer according to claim 4, wherein if said data prefetch buffer hits with respect to the request address, said address estimator controls said address generator so as to update the address stored in the latest hit address register to the request address, and so as to store in said data buffer storage unit a like plurality of successive data stored in the main memory at storage addresses contiguous to the request address in a direction determined by said flag.

6. A data prefetch buffer according to claim 2, wherein said address estimator estimates addresses by multiplying said result of the subtraction by an integer, and offsetting the request address by the multiplication product, where said integer is between 1 and said plurality.

7. A data prefetch buffer according to claim 2, wherein said data buffer storage unit includes means for managing an entry storing valid data and an entry storing invalid data, and wherein said data searcher searches the request address for the entry storing the valid data.

8. A data prefetch buffer according to claim 1 or 2, further comprising a universal control unit for controlling a plurality of data buffer modules, each data buffer module including one of said data buffer storage units, one of said address generators, one of said data searchers, and one of said address estimators.

9. A data prefetch buffer according to claim 8, wherein said universal control unit includes means responsive to the absence of data having the request address in the data buffer storage units of all of said plurality of buffer modules, for selecting from said plurality of buffer modules the buffer module which has not been accessed for the longest time, and making a new prefetch into the data buffer storage unit of the selected buffer module.

10. A data prefetch buffer according to claim 8, wherein said universal control unit includes means responsive to the absence of data having the request address in the data buffer storage units of all of said plurality of buffer modules and the presence of a buffer module in which the difference between the most recent hit address stored in the address estimator of such a buffer module and the request address is smaller than a predetermined value, for selecting such buffer module; and means responsive to the absence of data having the request address in the data buffer storage units of all of said plurality of buffer modules and the absence in said plurality of buffer modules of a buffer module in which said address difference is smaller than said predetermined value, for selecting from said plurality of buffer modules the buffer module which has not been accessed for the longest time, and for making a new prefetch into the data buffer storage unit of the selected buffer module, where the predetermined value is an integer defining an address area adjacent the most recent hit address.

11. A prefetch buffer according to claim 9 or 10, wherein said universal control unit includes means responsive to data having the request address existing in the data buffer storage unit of any of said plurality of buffer modules for making a new prefetch into such buffer module.

12. A data prefetch buffer according to claim 8, wherein said universal control unit includes means for dividing said plurality of buffer modules into two groups, and for separately managing the two groups for read miss of the cache memory and for write miss of the cache memory, respectively.

13. A data prefetch buffer according to claim 12, wherein said universal control unit includes: (a) means for managing in parallel both the buffer module for read miss which has not been accessed for the longest time and the buffer module for write miss which has not been accessed for the longest time, and (b) means responsive to all of said buffer modules with respect to the request address being mishit, for selecting, from said buffer modules of a different group with respect to the request address, the buffer module which has not been accessed for the longest time, altering the group of the selected buffer module so as to meet with the request address and storing, in the data buffer storage unit of said selected buffer module, data having an address contiguous to the request address.

* * * * *